United States Patent
Reul et al.

(10) Patent No.: US 10,348,011 B2
(45) Date of Patent: Jul. 9, 2019

(54) COMPOSITE PANE WITH ELECTRICAL CONTACT-MAKING MEANS

(71) Applicant: SAINT-GOBAIN GLASS FRANCE, Courbevoie (FR)

(72) Inventors: Bernhard Reul, Herzogenrath (DE); Guenther Schall, Kreuzau (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 261 days.

(21) Appl. No.: 14/416,056

(22) PCT Filed: Jun. 28, 2013

(86) PCT No.: PCT/EP2013/063630
§ 371 (c)(1),
(2) Date: Jan. 20, 2015

(87) PCT Pub. No.: WO2014/019780
PCT Pub. Date: Feb. 6, 2014

(65) Prior Publication Data
US 2015/0244089 A1 Aug. 27, 2015

(30) Foreign Application Priority Data
Aug. 1, 2012 (EP) .................................. 12178806

(51) Int. Cl.
*H01R 12/70* (2011.01)
*B32B 37/02* (2006.01)
(Continued)

(52) U.S. Cl.
CPC ....... *H01R 12/70* (2013.01); *B32B 17/10036* (2013.01); *B32B 17/10183* (2013.01);
(Continued)

(58) Field of Classification Search
None
See application file for complete search history.

(56) References Cited

U.S. PATENT DOCUMENTS 3,414,713 A * 12/1968 Reifeiss ................ A47F 3/0434
219/203
3,539,767 A * 11/1970 Eisler ..................... F24D 13/02
219/213
(Continued)

FOREIGN PATENT DOCUMENTS

DE 4126533 2/1993
DE 9013380 11/1994
(Continued)

OTHER PUBLICATIONS

PCT International Search Report dated Jul. 25, 2013 for PCT/EP2013/063630 filed on Jun. 28, 2013 in the name of Saint-Gobain Glass France.
(Continued)

*Primary Examiner* — Ibrahime A Abraham
*Assistant Examiner* — Gyounghyun Bae
(74) *Attorney, Agent, or Firm* — Pillsbury Winthrop Shaw Pittman LLP

(57) ABSTRACT

A composite pane with electrical contact-making means is described, having: a first pane and a second pane, which panes are connected to one another over their surface by means of a thermoplastic intermediate layer, at least one electrically conductive coating at least on the inner surface of the first pane, at least one busbar on a region of the electrically conductive coating, and at least one electrically conductive contact strip on at least one region of the busbar, wherein the contact strip is connected to at least one electrical feed line, and at least one region of the contact strip is in direct contact with the busbar.

26 Claims, 9 Drawing Sheets

(51) Int. Cl.
*H01R 4/00* (2006.01)
*H01R 43/00* (2006.01)
*B32B 17/10* (2006.01)
*H05B 3/06* (2006.01)
*H05B 3/86* (2006.01)

(52) U.S. Cl.
CPC .. *B32B 17/10229* (2013.01); *B32B 17/10761* (2013.01); *B32B 37/02* (2013.01); *H01R 4/00* (2013.01); *H01R 43/00* (2013.01); *H05B 3/06* (2013.01); *H05B 3/86* (2013.01); *B32B 2307/202* (2013.01); *H05B 2203/011* (2013.01); *H05B 2203/013* (2013.01)

(56) References Cited

U.S. PATENT DOCUMENTS

| | | | | |
|---|---|---|---|---|
| 3,825,918 A * | 7/1974 | Laidlaw, Jr. | G08B 13/04 | 109/21 |
| 5,089,687 A * | 2/1992 | Bartrug | B32B 17/10036 | 174/261 |
| 5,099,104 A * | 3/1992 | Holzer | B32B 17/10036 | 219/203 |
| 5,299,726 A | 4/1994 | Sauer | | |
| 5,543,601 A * | 8/1996 | Bartrug | B32B 17/10036 | 219/203 |
| 5,738,554 A * | 4/1998 | Borger | H01R 4/02 | 219/203 |
| 6,042,932 A | 3/2000 | Ingles | | |
| 6,204,480 B1 | 3/2001 | Woodard | | |
| 6,774,342 B2 * | 8/2004 | Capriotti | H05B 3/84 | 219/203 |
| 7,617,964 B2 * | 11/2009 | Winter | B23K 35/02 | 219/202 |
| 7,880,120 B2 * | 2/2011 | Schmidt | B32B 17/10036 | 219/203 |
| 8,633,426 B2 * | 1/2014 | MacHer | H05B 3/84 | 219/203 |
| 8,927,911 B2 * | 1/2015 | Short | H05B 3/84 | 219/541 |
| 2002/0153368 A1 * | 10/2002 | Gardner | B29C 70/82 | 219/545 |
| 2003/0127452 A1 * | 7/2003 | Gerhardinger | A47F 3/0434 | 219/497 |
| 2003/0146199 A1 | 8/2003 | Sol | | |
| 2004/0016738 A1 * | 1/2004 | Bartrug | B32B 3/10 | 219/203 |
| 2004/0016739 A1 * | 1/2004 | Hawk | H05B 3/84 | 219/203 |
| 2004/0065651 A1 * | 4/2004 | Voeltzel | B32B 17/10036 | 219/203 |
| 2004/0084432 A1 * | 5/2004 | Schwartz | B60S 1/048 | 219/203 |
| 2004/0200821 A1 * | 10/2004 | Voeltzel | B32B 17/10036 | 219/203 |
| 2005/0045700 A1 * | 3/2005 | Winter | B23K 35/02 | 228/246 |
| 2005/0178756 A1 * | 8/2005 | Degand | H05B 3/84 | 219/203 |
| 2006/0042076 A1 * | 3/2006 | Previti | H05B 3/146 | 29/825 |
| 2006/0186104 A1 * | 8/2006 | Winter | H05B 3/84 | 219/203 |
| 2006/0186105 A1 * | 8/2006 | Voeltzel | B32B 17/10036 | 219/203 |
| 2007/0029299 A1 * | 2/2007 | Prone | B32B 17/10036 | 219/203 |
| 2008/0264930 A1 * | 10/2008 | Mennechez | H05B 3/26 | 219/552 |
| 2009/0044464 A1 * | 2/2009 | Schmidt | B32B 17/10036 | 52/171.2 |
| 2009/0302760 A1 * | 12/2009 | Tchakarov | H01L 51/5203 | 313/512 |
| 2011/0017487 A1 * | 1/2011 | Short | H05B 3/84 | 174/68.2 |
| 2011/0017725 A1 * | 1/2011 | Figurelli | H05B 3/84 | 219/546 |
| 2013/0092676 A1 * | 4/2013 | Offermann | B32B 17/10036 | 219/203 |
| 2013/0153559 A1 * | 6/2013 | Choi | H05B 3/84 | 219/203 |
| 2014/0151355 A1 * | 6/2014 | Lisinski | B32B 17/10 | 219/203 |

FOREIGN PATENT DOCUMENTS

| | | |
|---|---|---|
| DE | 19829151 | 2/2000 |
| DE | 10249992 | 12/2003 |
| DE | 102004050158 | 3/2011 |
| WO | 2009152871 | 12/2009 |

OTHER PUBLICATIONS

Written Opinion for PCT/EP2013/063630, filed Jun. 28, 2013 in the name of Saint-Gobain Glass France: dated Jul. 25, 2013 (German original and English translation).

* cited by examiner

COMPOSITE PANE WITH ELECTRICAL CONTACT-MAKING MEANS

CROSS REFERENCE TO RELATED APPLICATIONS

The present application is the US national stage of International Patent Application PCT/EP2013/063630 filed internationally on Jun. 28, 2013 which, in turn, claims priority to European Patent Application No. 12178806.1 filed on Aug. 1, 2012.

BACKGROUND OF THE INVENTION

The invention relates to a composite pane with electrical contact-making means, a method for production thereof, and use thereof.

Composite panes are known, which have, on an interior-side surface of one of the individual panes, an electrically conductive coating, which makes electrical contact, i.e., for example, is connected to an external voltage source or a receiver. Such an electrically conductive coating is, for example, a metal-based heatable coating. Other known electrically conductive coatings are, for example, plate electrodes of an electrically switchable functional element, such as an electrochromic functional element, or a thin-film photovoltaic module. The electrical contacting of the electrically conductive coating is typically done via a busbar, for example, made of a printed and fired silver paste. The busbar can be electrically conductively connected to the external feed line, for example, to a flat conductor, directly or also via a contact strip made of a thin copper foil. In prior art composite panes with electrical contacting means, the feed line or the contact strip is connected to the busbar via a soldering compound or an electrically conductive adhesive. The soldering or gluing is its own process step in the production sequence and, consequently, makes the production of the composite panes more difficult.

SUMMARY OF THE INVENTION

The object of the present invention consists in providing an improved composite pane with electrical contacting means that is simple and economical to produce.

The object of the present invention is accomplished according to the invention by a composite pane with electrical contacting means according to claim 1. Preferred embodiments emerge from the subclaims.

The composite pane according to the invention with electrical contacting means comprises at least the following characteristics:
- a first pane and a second pane, that are bonded face-to-face to each other via a thermoplastic intermediate layer,
- at least one electrically conductive coating at least on the interior-side surface of the first pane,
- at least one busbar on a region of the electrically conductive coating, and
- at least one electrically conductive contact strip on at least one region of the busbar, wherein the contact strip is connected to at least one electrical feed line and at least one region of the contact strip is in direct contact with the busbar.

The first pane and the second pane have in each case one interior-side surface and one exterior-side surface. The interior-side surfaces of the first and the second pane face each other and are bonded to each other via the thermoplastic intermediate layer. The exterior-sided surfaces of the first and the second pane face away from each other and from the thermoplastic intermediate layer. The electrically conductive coating is applied on the interior-side surface of the first pane. Of course, another electrically conductive coating can also be applied on the interior-side surface of the second pane. The exterior-side surfaces of the panes can also have coatings. The terms "first pane" and "second pane" are selected to distinguish the two panes of the composite pane. No statement concerning the geometric arrangement is associated with the terms. When the composite pane according to the invention is provided, for example, in an opening, for example, of a motor vehicle or a building, to separate the interior from the external environment, first pane can face the interior or the external environment.

The particular advantage of the invention consists in that at least one region of the contact strip is in direct contact with the busbar. The electrically conducting connection between the busbar and the contact strip is, in other words, not made via a melting soldering compound or an electrically conductive adhesive, but, instead, by direct contact of the contact strip with the busbar. Thus, the production of the composite pane is significantly simplified since an otherwise essential process step, for example, the soldering or gluing of the contact strip on the busbar is eliminated. The production process is faster, and personnel costs, equipment costs, and investments can be saved. Moreover, damage to the busbar, as can, for example, occur during soldering or in the case of mechanical loading of a soldered or glued connection, is advantageously avoided.

In the context of the invention, "direct contact" refers to a contact without mechanical connection (for instance, by gluing or soldering). Thus, there is no mechanical connection between the busbar and the region of the contact strip, in particular no connection via a soldering compound or an adhesive.

According to the invention, the busbar is arranged above the electrically conductive coating and the contact strip above the busbar. This means that the busbar is arranged on the surface of the electrically conductive coating facing away from the pane surface provided with the coating and the contact strip is arranged on the surface of the busbar facing away from the electrically conductive coating.

The busbar serves to form a homogeneous electrical field in the electrically conductive coating. For this, the busbar is preferably arranged in the edge region of the electrically conductive coating along one side edge on the the electrically conductive coating. The length of the busbar is typically substantially equal to the length of the side edge of the electrically conductive coating, but can also be slightly larger or smaller. Also, two bus bars can be arranged on the the electrically conductive coating, preferably in the edge region along two opposite side edges of the electrically conductive coating. This is, for example, the case when the electrically conductive coating is an electrically heatable coating through which a current is supposed to flow. However, even more than two bus bars can be arranged on the electrically conductive coating, for example, in order to form two or more independent heating fields in one electrically heatable coating.

The width of the busbar is preferably from 2 mm to 30 mm, particularly preferably from 4 mm to 20 mm. Narrower busbars result in excessively high electrical resistance and thus in excessively high heating of the busbar during operation. Wider busbars require an undesirably high use of materials and excessively large and unaesthetic reduction of the see-through area of the composite pane. The length of the busbar is based on the dimension of the electrically conductive coating.

In the busbar, which is typically implemented in the shape of a strip, the longer of its dimensions is referred to as length and the less long of its dimensions is referred to as width.

In a preferred embodiment, the busbar is implemented as a printed and fired conductive structure. The printed busbar contains at least one metal, preferably silver. The electrical conductivity is preferably realized via metal particles contained in the busbar, particularly preferably via silver particles. The metal particles can be situated in an organic and/or inorganic matrix such as pastes or inks, preferably as a fired screen printing paste with glass frits. The layer thickness of the printed busbar is preferably from 5 μm to 40 μm, particularly preferably from 8 μm to 20 μm, and most particularly preferably from 10 μm to 15 μm. Printed busbars with these thicknesses are technically simple to realize and have an advantageous current carrying capacity.

Alternatively, however, the busbar can also be implemented as a strip of an electrically conductive foil. In that case, the busbar contains, for example, at least aluminum, copper, tinned copper, gold, silver, zinc, tungsten, and/or tin or alloys thereof. The strip preferably has a thickness from 10 μm to 500 μm, particularly preferably from 30 μm to 300 μm. Busbars made of electrically conductive foils with these thicknesses are technically simple to realize and have an advantageous current carrying capacity. The strip can be electrically conductively connected to the electrically conductive structure, for example, by a soldering compound, via an electrically conductive adhesive, or by direct placement.

However, the busbar can also, for example, be formed from the electrically conductive coating through the introduction of ultrasonic solder points. Typically, a row of ultrasonic solder points that are connected to each other via the contact strip is introduced into the electrically conductive coating, with each ultrasonic solder point fulfilling the function of a busbar.

The contact strip can also be in direct contact with multiple busbars.

The contact strip, which can also be referred to as a contact electrode, advantageously increases the current carrying capacity of the busbar. Moreover, by means of the contact strip, unwanted heating of the contact point between the busbar and feed line can be reduced. In addition, the contact strip simplifies the electrical contacting of the busbar by the electrical feed line, since the feed line does not have to be connected, for example, soldered, to the already applied busbar.

The contact strip preferably contains at least one metal, particularly preferably copper, tinned copper, silver, gold, aluminum, zinc, tungsten, and/or tin. This is particularly advantageous with regard to the electrical conductivity of the contact strip. The contact strip can also contain alloys, which preferably contain one or more of the elements mentioned, and, optionally, contains other elements, for example, brass or bronze.

The contact strip is preferably implemented as a strip of thin, electrically conductive foil. The thickness of the contact strip is preferably from 10 μm to 500 μm, particularly preferably from 15 μm to 200 μm, most particularly preferably from 50 μm to 100 μm. Foils with these thicknesses are technically simple to produce and readily available and have, in addition, advantageously low electrical resistance.

The length of the contact strip can, in principle, be equal to the length of the busbar and be arranged on the busbar along the entire length of the busbar. Advantageously, however, the contact strip has a shorter length than the busbar. Thus, the contact strip is easier to handle such that the risk of damage and creasing of the contact strip is reduced, and, moreover, material can be saved. The length of the contact strip is preferably from 10 mm to 100 mm, particularly preferably from 20 mm to 60 mm. This is particularly advantageous with regard to the good handleability of the contact strip as well as with regard to an adequately large contact surface between the busbar and the contact strip for electrical contacting.

In an alternative preferred embodiment, the length of the contact strip is from 80% to 120%, preferably from 90% to 110% of the length of the busbar. By means of such a contact strip, the current carrying capacity of the busbar is advantageously increased. The busbar is, so to speak, relieved of its load such that local hot spots can be avoided.

The total useful range for the length of the contact strip is thus roughly from 10 cm to 120% of the length of the busbar.

The width of the contact strip is preferably from 2 mm to 40 mm, particularly preferably from 5 mm to 30 mm. This is particularly advantageous with regard to the contact surface between the contact strip and the busbar and a simple connection of the contact strip to the electrical feed line. The expressions "length" and "width" of the contact strip refer in each case to the dimension in the same direction of propagation, by which the length or the width, respectively" of the busbar is indicated.

In a preferred embodiment, the contact strip is in direct full-surface contact with the busbar. For this, a contact strip, whose length and width correspond at most to the length and width of the busbar, but are typically smaller than the length and width of the busbar, is placed on the busbar. The particular advantage resides in simple production of the composite pane and utilization of the entire surface of the contact strip as the contact surface.

In an alternative preferred embodiment, the contact strip has a greater width than the busbar. The contact strip protrudes beyond at least one side edge of the busbar, preferably beyond two opposite side edges of the busbar. In the region of the busbar, the contact strip is preferably in direct full-surface contact with the busbar. The particular advantage consists in that the entire width of the busbar is utilized as a contacting surface. Moreover, stresses or loads that can develop in the region of the side edges of the contact strip when the side edges are arranged on the busbar can be reduced.

A region of the contact strip can, however, also be bonded to the busbar via a double-sided adhesive strip. This region does not then contribute to the electrically conducting connection between the contact strip and the busbar. Apart from the region of the adhesive strip, the contact strip is in direct contact with the busbar. Such a double-sided adhesive strip can have process-engineering advantages since the contact strip is fixed on the busbar during the production of the composite pane and, for example, cannot be shifted unintentionally.

A strip of an electrically conductive foil can also include a first section that is arranged on the busbar and is in direct (preferably full-surface) contact with the busbar and a second section that leads away from the busbar and, away from the busbar, is connected to the electrical feed line. In this case, the first section forms the actual contact strip and the second section forms an electrical connection element, with the contact strip and the connection element implemented in one piece by the strip of the electrically conductive foil. For this, the strip of the electrically conductive foil can be appropriately folded one or more times in order to produce a desired change in direction. The contacting point between the connection element and the electrical feed line can be arranged inside or even outside the composite pane. When the contacting point is arranged outside the composite pane, the connection element extends, starting from the busbar beyond the side edge of the composite pane. Alternatively, the contact strip and the electrical connection element can, of course, in principle, also be implemented in two pieces, for example, each as a strip of an electrically conductive foil.

The contact surface between the busbar and the contact strip should be greater than or equal to 150 mm$^2$, particularly preferably greater than or equal to 300 mm$^2$, in particular when the electrically conductive coating is a heatable coating or a plate electrode. Thus, an advantageous transfer of the current flow is achieved. The contact surface can be smaller than or equal to 600 mm$^2$. When the electrically conductive coating is, for example, an antenna structure, the contact surface can be selected significantly smaller and should be greater than or equal to 20 mm$^2$.

According to the invention, at least one contact strip is arranged on the busbar. However, more than one contact strip, for example, two contact strips can also be arranged, each on one region of the same busbar. This can be desirable in order to reduce the flow of current through the feed lines connected to the contact strips, which results in reduced thermal loading of the composite pane in the regions of the individual contact strips.

The contact strip can simply be laid on the busbar and is durably stably fixed at the intended position inside the laminated composite pane.

Alternatively, the contact strip can be fixed on the busbar by means of an adhesive strip. The adhesive strip has at least one region that is arranged on the surface of the contact strip facing away from the busbar and at least one other region that is arranged on the surface of the pane, on the electrically conductive structure, or on the busbar. Pressure is exerted on the contact strip in the direction of the busbar by the adhesive strip. Thus, the electrically conducting connection between the contact strip and the busbar is advantageously stabilized. Moreover, the use of the adhesive strip has advantages from the process-engineering standpoint since the contact strip can be fixed on busbar during the production of the composite pane and, thus, cannot, for example, be unintentionally shifted, folded, or otherwise damaged. The length and/or the width of the adhesive strip can be selected greater than the length or the width of the contact strip such that the adhesive strip protrudes beyond the contact strip on at least two opposite edges. Such a configuration has the advantage that, during production of the composite pane, the adhesive strip protruding beyond the side edges of the contact strip and connected to the pane surface, the busbar, or the electrically conductive structure prevents melted thermoplastic material of the intermediate layer from flowing between the busbar and the contact strip and interfering with the electrical connection. However, one or a plurality of holes, within which the adhesive strip is adhered to the busbar, can be introduced into the contact strip. Such a configuration has the advantage that the dimensions of the adhesive strip can be selected less than or equal to the dimensions of the contact strip such that the adhesive strip does not protrude beyond the edges of the contact strip, which can be desirable, for example, for aesthetic reasons.

In an advantageous embodiment, a pressure element is arranged between the contact strip and the second pane. The pressure element can, for example, be arranged between the contact strip and the thermoplastic intermediate layer or even between the thermoplastic intermediate layer and the second pane or between two films of the intermediate layer in the region of the contact strip. The pressure element is suitably rigid, i.e., has low elasticity. By means of the pressure element inside the composite pane, an additional pressure is exerted on the contact strip in the direction of the busbar. Thus, the electrically conducting connection between the contact strip and the busbar is advantageously stabilized.

The pressure element can contain, for example, at least one polymer, for example, polycarbonate (PC) or polymethyl methacrylate (PMMA). However, the pressure element can also contain at least one metal or one alloy, for example, copper or steel. The thickness of the pressure element is preferably greater than or equal to 200 µm. The upper limit for the thickness of the pressure element is ultimately determined by the desired distance between the first and the second pane. The thickness of the pressure element can, for example, be from 200 µm to 700 µm. The minimum length and width of the pressure element are determined by the desired contact region between the busbar and the contact strip. The pressure element has, for example, a length from 10 mm to 100 mm or from 20 mm to 60 mm and a width from 2 mm to 40 mm or from 5 mm to 30 mm.

The pressure element can simply be placed, during production of the composite pane, at a suitable position in the composite. However, the pressure element can also be fixed on the contact strip or on the interior-side surface of the second pane, for example, by means of a double-sided adhesive strip.

A pressure element can even be implemented in one piece with the contact strip. The contact strip is formed by a section of a foil strip, with at least one bent section, preferably a plurality of sections of the foil strip bent and folded one over another forming the pressure element.

The electrically conductive coating can, in principle, be any coating that is intended to be electrically contacted. If the composite pane according to the invention is intended to allow vision through it, as is the case, for example, with composite panes in the window region, the electrically conductive coating is preferably transparent in the visible spectral range. In the context of the invention, a transparent coating has transmittance in the visible spectral range of more than 70%, preferably more than 85%. In an advantageous embodiment, the electrically conductive coating is a layer or a layer structure of multiple individual layers with a total thickness less than or equal to 2 µm, particularly preferably less than or equal to 1 µm.

The electrically conductive coating can be, for example, an electrically heatable coating, by means of which the composite pane is provided with a heating function. Such heatable coatings are known per se to the person skilled in the art. They typically include one or more, for example, two, three, or four electrically conductive functional layers. The functional layers preferably contain at least one metal, for example, silver, gold, copper, nickel, and/or chromium, or a metal alloy. The functional layers particularly preferably contain at least 90 wt.-% of the metal, in particular at least 99.9 wt.-% of the metal. The functional layers can be made of the metal or metal alloy. The functional layers particularly preferably contain silver or a silver-containing alloy. Such functional layers have particularly advantageous electrical conductivity and, at the same time, high transmittance in the visible spectral range. The thickness of the functional layer is preferably from 5 nm to 50 nm, particularly preferably from 8 nm to 25 nm. In this range for the thickness of the functional layer, an advantageously high transmittance in the visible spectral range and a particularly advantageous electrical conductivity are obtained.

Typically, in each case, at least one dielectric layer is arranged between two adjacent functional layers of the heatable coating. Preferably, another dielectric layer is arranged below the first and/or above the last functional layer. A dielectric layer contains at least one individual layer made of a dielectric material, for example, containing a nitride such as silicon nitride or an oxide such as aluminum oxide. However, a dielectric layer can also contain a plurality of individual layers, for example, individual layers of a dielectric material, smoothing layers, matching layers, blocker layers, and/or anti-reflection layers. The thickness of a dielectric layer is, for example, from 10 nm to 200 nm.

The electrically conductive coating can, however, also be a plate electrode, for example, the plate electrode of a photovoltaic module known per se, preferably in a thin-film photovoltaic module, or the plate electrode of a composite pane with electrically switchable or variable optical properties. Such composite panes contain electrically switchable or adjustable functional elements, for example, SPD (suspended particle device), PDLC (polymer dispersed liquid crystal), electrochromic, or electroluminescent functional elements and are known per se to the person skilled in the art. The plate electrodes contain at least one metal, a metal alloy, or a transparent conducting oxide (TCO), for example, silver, or molybdenum, indium tin oxide (ITO) or aluminum-doped zinc oxide, and have layer thicknesses, for example, from 200 nm to 2 μm. The electrically conductive coating can also be a polymeric electrically conductive coating, for example, containing at least one conjugated polymer or a polymer provided with conductive particles.

The electrically heatable coating can also be a coating with an antenna function.

The electrically conductive coating is preferably an electrically heatable coating, a plate electrode, or an antenna and is preferably transparent.

The electrically conductive coating can extend over the entire interior-side surface of the first pane. Alternatively, the electrically conductive coating can, however, also extend over only part of the interior-side surface of the first pane. The electrically conductive coating preferably extends over at least 50%, particularly preferably over at least 70%, and most particularly preferably over at least 90% of the interior-side surface of the first pane. The electrically conductive coating can, however, extend over smaller portions of the interior-side surface of the first pane, for example, less than 50%, less than 30%, or less than 20%. This can, for example, be desirable, when only a small region of the composite pane is to be electrically heated.

In an advantageous embodiment, the interior-side surface of the first pane has a circumferential edge region with a width from 2 mm to 50 mm, preferably from 5 mm to 20 mm, which is not provided with the electrically conductive coating. The electrically conductive coating has, in that case, no contact with the atmosphere and, in the interior of the composite pane, is advantageously protected by the thermoplastic intermediate layer against damage and corrosion. The interior-side surface of the first pane can be coating-free in one or a plurality of other areas. When the electrically conductive coating is an electrically heatable coating, such coating-free areas are known to the person skilled in the art, for example, as data transfer windows or communications windows.

According to the invention, the electrical feed line is connected to the contact strip. The electrical feed line extends starting from the contact strip beyond one side edge of the composite pane and serves for connection of the contact strip to an external functional element, for example, a power supply or a receiver. The electrical feed line is preferably implemented as a flexible foil conductor (flat conductor, ribbon cable) known per se. This means an electrical conductor whose width is significantly greater than its thickness. Such a foil conductor is, for example, a strip or tape containing or made of copper, tinned copper, aluminum, silver, gold, or alloys thereof. The foil conductor has, for example, a width from 2 mm to 16 mm and a thickness from 0.03 mm to 0.1 mm. The foil conductor can have an insulating, preferably polymeric sheath, for example, based on polyimide. Foil conductors that are suitable for the contacting of electrically conductive coatings in composite panes have only a total thickness of, for example, 0.3 mm. Such thin foil conductors can be embedded without difficulty between the individual panes in the thermoplastic intermediate layer. Multiple conductive layers electrically insulated from each other can be situated in a foil conductor strip. The electrical feed line is preferably connected to the contact strip, for example, by a soldering compound or an electrically conductive adhesive, before the contact strip is introduced into the composite pane. This is advantageous with regard to a stable electrical connection between the feed line and the contact strip and with regard to simple production of the composite pane.

Alternatively, thin metal wires can also be used as the electrical feed line. The metal wires include in particular copper, tungsten, gold, silver, or aluminum or alloys of at least two of these metals. These alloys can also contain molybdenum, rhenium, osmium, iridium, palladium, or platinum.

The first pane and the second pane are preferably transparent. The first pane and/or the second pane preferably contain glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, and/or polyvinyl chloride.

In the context of the invention, "transparent" means a pane or a coating that has transmittance in the visible spectral range of more than 70%, preferably more than 85%.

The thicknesses as well as the size of the first pane and the second pane can vary widely and are determined by the intended use of the composite pane. The first pane and/or the second pane preferably have a thickness from 1.0 mm to 25 mm, particularly preferably from 1.4 mm to 6 mm. The first pane and the second pane have, for example, areas customary in the motor vehicle sector and in the architectural sector from 200 cm$^2$ up to 20 m$^2$.

The composite pane can have any three-dimensional shape. The composite pane is preferably planar or slightly or greatly curved in one or more spatial direction.

The thermoplastic intermediate layer contains at least one thermoplastic plastic, preferably polyvinyl butyral (PVB), ethylene vinyl acetate (EVA), and/or polyethylene terephthalate (PET). The thermoplastic intermediate layer can, however, also contain, for example, polyurethane (PU), polypropylene (PP), polyacrylate, polyethylene (PE), polycarbonate (PC), polymethyl methacrylate, polyvinyl chloride, polyacetate resin, casting resins, acrylates, fluorinated ethylene propylenes, polyvinyl fluoride, and/or ethylene tetrafluoroethylene, or copolymers or mixtures thereof. The thermoplastic intermediate layer can be implemented by one or even by a plurality of thermoplastic films arranged one over another, with the thickness of a thermoplastic film being preferably from 0.25 mm to 1 mm, typically 0.38 mm or 0.76 mm.

The invention further includes a method for producing a composite pane with electrical contacting means, at least comprising:

(a) applying an electrically conductive coating on one surface of a first pane,
(b) applying at least one busbar on a region of the electrically conductive coating,
(c) arranging a thermoplastic intermediate layer on the surface of the first pane and arranging a second pane on the thermoplastic intermediate layer and arranging at least one electrically conductive contact strip connected to an electrical feed line such that at least one region of the contact strip is in direct contact with the busbar, and
(d) bonding the first pane and the second pane via the thermoplastic intermediate layer.

The labeling of the process steps by letters is not intended necessarily to define an order of the process steps, but rather to facilitate subsequent reference. Different orders of the process steps are also conceivable. For example, it can be desirable in the individual case to first apply the busbar on the surface of the pane and then to apply an electrically conductive coating.

In a first preferred embodiment of the method according to the invention, in process step (c), the contact strip is arranged on the busbar and the thermoplastic intermediate layer is then arranged on the surface of the first pane.

The first preferred embodiment of the method according to the invention then includes at least the following process steps:

(I) applying an electrically conductive coating on one surface of a first pane,
(II) applying at least one busbar on a region of the electrically conductive coating,
(III) arranging at least one electrically conductive contact strip connected to an electrical feed line on at least one region of the busbar,
(IV) arranging a thermoplastic intermediate layer on the surface of the first pane and arranging a second pane on the thermoplastic intermediate layer,
(V) bonding the first pane and the second pane via the thermoplastic intermediate layer.

In process step (c) or (III) of the first preferred embodiment, the contact strip can be placed on the region of the busbar. Alternatively, the contact strip can be fixed on the busbar by means of a double-sided adhesive strip. Alternatively, the contact strip can be fixed on the busbar by means of an adhesive strip that runs over the surface of the contact strip facing away from the busbar.

In a second preferred embodiment of the method according to the invention, in process step (c), the contact strip is mounted on the thermoplastic intermediate layer and the thermoplastic intermediate layer with the contact strip is then arranged on the surface of the first pane.

The second preferred embodiment of the method according to the invention includes, for example, at least the following process steps:

(I) applying an electrically conductive coating on one surface of a first pane,
(II) applying at least one busbar on a region of the electrically conductive coating,
(III) mounting at least one electrically conductive contact strip connected to an electrical feed line on a thermoplastic intermediate layer,
(IV) arranging the thermoplastic intermediate layer on the surface of the first pane and arranging a second pane on the thermoplastic intermediate layer,
(V) bonding the first pane and the second pane via the thermoplastic intermediate layer.

The process steps (I), (II), and (III) can, alternatively, also take place in a different temporal order. The mounting of the contact strip on the thermoplastic intermediate layer can take place before or after or at the same time as the applying of the electrically conductive coating on the first pane. The mounting of the contact strip on the thermoplastic intermediate layer can take place before or after or at the same time as the applying of the busbar on the electrically conductive coating.

The advantage of the second preferred embodiment consists in the mounting of the contact strip on the thermoplastic intermediate layer. Thus, the contact strip can be fixed at the desired position and there is no risk that the contact strip will shift during the arranging of the thermoplastic layer. This is, in particular, advantageous when the thermoplastic layer has a complex shape, for example, with holes or recesses. This is, for example, frequently the case with modern windshields. The thermoplastic intermediate layer must then frequently be shifted on the first pane in order to be correctly positioned. Due to the fact that the contact strip is mounted at a suitable position on the thermoplastic intermediate layer, it makes electrical contact with the busbar as soon as the thermoplastic intermediate layer is correctly positioned. The production of composite pane is thus advantageously simplified and accelerated.

The contact strip connected to the electrical feed line is, of course, installed on the thermoplastic intermediate layer such that the electrical feed line is arranged between a thermoplastic layer and a contact strip and extends starting from the contact strip beyond the side edge of the thermoplastic layer.

The mounting of the contact strip on the thermoplastic intermediate layer can be done by locally limited heating of the thermoplastic intermediate layer, for example, by means of a handheld soldering iron. The heated and thus softened region of the thermoplastic intermediate layer has adhesive properties such that the contact strip can be bonded onto the thermoplastic intermediate layer and is, in the re-cooled state, durably stably mounted on the thermoplastic intermediate layer.

In process step (IV) of the second preferred embodiment, the thermoplastic intermediate layer is, of course, arranged such that the one of its surfaces on which the contact strip is mounted faces the first pane.

The following statements refer equally to the first and the second preferred embodiments of the method according to the invention.

The applying of the electrically conductive coating in process step (a) can be done using methods known per se, preferably by magnetic field assisted cathodic sputtering. This is particularly advantageous with regard to simple, fast, economical, and uniform coating of the first pane. The electrically conductive coating can, however, also be applied, for example, by vapor deposition, chemical vapor deposition (CVD), plasma enhanced chemical vapor deposition (PECVD), or by wet chemical methods.

After process step (a), the first pane can be subjected to a temperature treatment. The first pane with the electrically conductive coating is heated to a temperature of at least 200° C., preferably at least 300° C. The temperature treatment can serve to increase the transmittance and/or to reduce the sheet resistance of the electrically conductive coating.

After process step (a), the first pane can be bent, typically at a temperature from 500° C. to 700° C. Since it is technically simpler to coat a flat pane, this approach is advantageous when the first pane is to be bent. However, alternatively, the first pane can also be bent before process step (a), for example, if the electrically conductive coating is not suitable to withstand a bending process without damage.

The applying of the busbar in process step (b) is preferably done by printing and firing an electrically conductive paste in the screenprinting method or in an inkjet method. Alternatively, the busbar can be applied, preferably placed, soldered, or glued as a strip of an electrically conductive film on the electrically conductive coating.

In process step (c), the first pane is, of course, arranged such that the one of its surfaces that is provided with the electrically conductive coating faces the thermoplastic intermediate layer. The surface thus becomes the interior-side surface of the first pane.

In process step (c), a pressure element can be suitably inserted into the composite or be bonded, for example, by gluing to the contact strip or to the second pane or to the thermoplastic intermediate layer.

The thermoplastic intermediate layer is preferably provided as at least one thermoplastic film. The thermoplastic intermediate layer can be implemented by a single thermoplastic film or even by two or more thermoplastic films that are arranged congruently one over another.

The bonding of the first and the second pane in process step (d) is preferably done under the action of heat, vacuum, and/or pressure. Methods known per se for producing a composite pane can be used.

For example, so-called autoclave methods can be performed at an elevated pressure of roughly 10 bar to 15 bar and temperatures from 130° C. to 145° C. over roughly 2 hours. Vacuum bag or vacuum ring methods operate, for example, at roughly 200 mbar and 130° C. to 145° C. The first pane, the thermoplastic intermediate layer, and the second pane can also be pressed in a calender between at least one pair of rollers to form a composite pane. Facilities of this type for producing composite panes are known and usually have at least one heating tunnel upstream from a pressing system. During the pressing procedure, the temperature is, for example, from 40° C. to 150° C.

Combinations of calender and autoclave methods have proved particularly effective in practice. Alternatively, vacuum laminators can be used. These consist of one or a plurality of heatable and evacuable chambers in which the first pane and the second pane can be laminated within, for example, roughly 60 minutes at reduced pressures from 0.01 mbar to 800 mbar and temperatures from 80° C. to 170° C.

The invention further includes the use of the composite pane according to the invention with electrical contacting means in buildings, in particular in the areas of access, windows, roofs, or façades, as built-in components in furniture and appliances, in means of transportation for travel on land, in the air, or on water, in particular in trains, ships, and motor vehicles, for example, as a windshield, rear window, side window, and/or roof panel. The composite pane is preferably used as a heatable pane, as a pane with an antenna function, as a pane with heatable or variable optical properties or as a photovoltaic module, in particular a thin-film photovoltaic module.

BRIEF DESCRIPTION OF THE DRAWINGS

In the following, the invention is explained in detail with reference to drawings and exemplary embodiments. The drawings are schematic representations and are not true to scale. The drawings in no way restrict the invention.

They depict.

DETAILED DESCRIPTION

Figure 1:
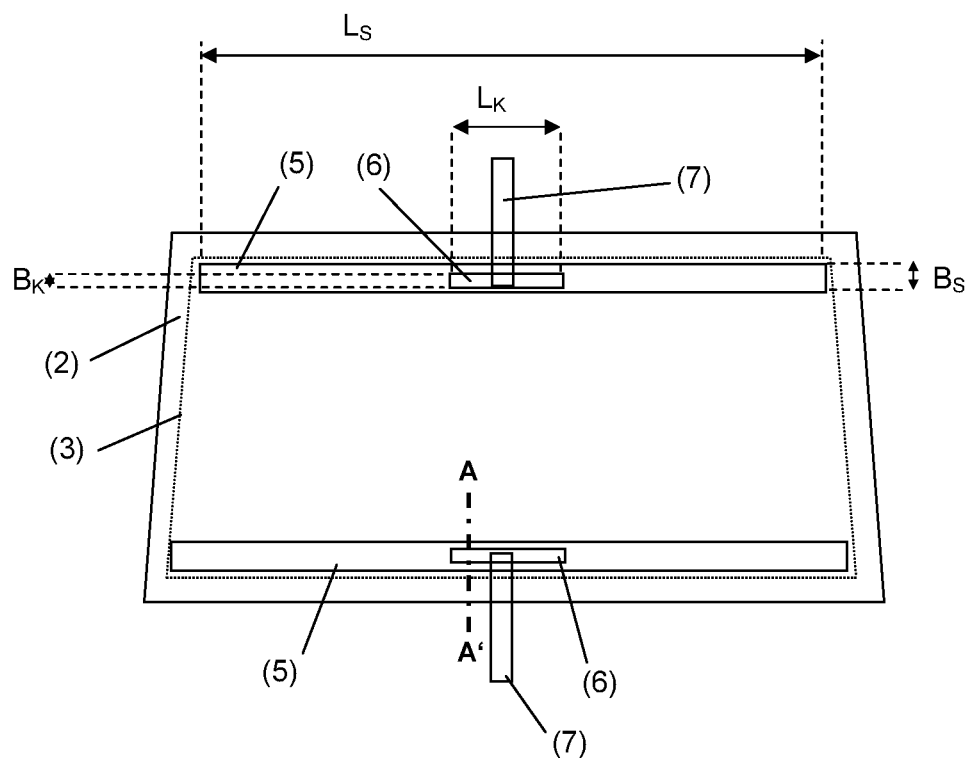
FIG. 1 a top plan view of an embodiment of the composite pane according to the invention with electrical contacting means, FIG. 2 a section along A-A' through the composite pane of FIG. 1, FIG. 3 a section along A-A' through the other embodiment of the composite pane according to the invention, FIG. 4 a section A-A' through the other embodiment of the composite pane according to the invention, FIG. 5 a section along A-A' through the other embodiment of the composite pane according to the invention, FIG. 6 a top plan view of another embodiment of the composite pane according to the invention, FIG. 6a a top plan view of another embodiment of the composite pane according to the invention, FIG. 7 a detailed flow chart of one embodiment of the method according to the invention, and FIG. 8 a detailed flow chart of another embodiment of the method according to the invention.
Figure 2:
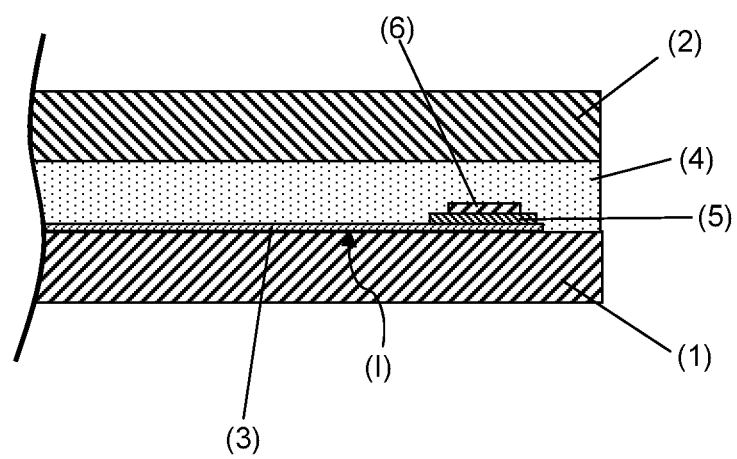

FIG. 1 and FIG. 2 each depict a detail of an embodiment of the composite pane according to the invention with electrical contacting means. The transparent composite pane comprises a first pane 1 and a second pane 2, which are bonded to each other via a thermoplastic intermediate layer 4. The composite pane is the windshield of a passenger car, wherein the first pane is intended to face the interior in the installed position. The first pane 1 and the second pane 2 are made of soda lime glass. The thickness of the first pane 1 is 1.6 mm; the thickness of the second pane 2 is 2.1 mm. The thermoplastic intermediate layer 4 is made of polyvinyl butyral (PVB) and has a thickness of 0.76 mm. An electrically conductive coating 3 is applied on the interior-side surface (I) of the first pane 1. The electrically conductive coating 3 is a layer system, which contains, for example, three electrically conductive silver layers, which are separated from each other by dielectric layers. When a current flows through the electrically conductive coating 3, it is heated as a result of its electrical resistance. The electrically conductive coating 3 can, consequently, be used for active heating of the composite pane.

The electrically conductive coating 3 extends over the entire surface (I) of the first pane 1 minus a circumferential frame-like coating-free region with a width of 8 mm. The coating-free region serves for the electrical insulation between the current-carrying electrically conductive coating 3 and the motor vehicle body. The coating-free region is hermetically sealed by bonding with the intermediate layer 4 in order to protect the electrically conductive coating 3 against damage and corrosion.

For the electrical contacting of the electrically conductive coating 3, a busbar 5 is in each case arranged in the upper and in the lower edge region on the electrically conductive coating. The busbars 5 contain silver particles and glass frits and are applied using the screenprinting method. Each busbar has a thickness of roughly 15 μm and a width $B_S$ of 16 mm. The length $L_S$ of the busbars 5 corresponds approx. to the dimension of the electrically conductive coating 3. When an electric voltage is applied on the busbars 5 a uniform current flows through the electrically conductive coating 3 between the busbars 5. On each bar, a contact strip 6 is arranged approx. centrally. The contact strip 6 serves for the simple connection of the busbar 5 to an external feed line 7. In addition, the contact strip 6 advantageously increases the current carrying capacity of the busbar 5. The contact strip 6 is in direct full-surface contact with the busbar 5. The contact strip 6 was placed on the busbar 5 during the production of the composite pane and is durably stably fixed on the busbar 5 by the thermoplastic layer 4. The contact strip 6 is made of copper and has a thickness of 100 μm, a width $B_K$ of 8 mm, and a length $L_K$ of 5 cm.

The external feed line 7 is a foil conductor known per se, which is connected to the contact strip according to the prior art, for example, by a soldering compound or an electrically conductive adhesive. The foil conductor contains a tinned copper foil with a width of 10 mm and a thickness of 0.3 mm. Via the electrical feed lines 7, the busbars 5 are connected via connection cables (not shown) to a voltage source (not shown), which provides onboard voltages customary for motor vehicles, preferably from 12 V to 50 V, for example, from 12 V to 15 V (for instance, 14 V), roughly 42 V or roughly 48 V. By means of an opaque ink layer known per se as a masking print it is possible to prevent the region of the busbar 5 from being visible to an observer. The masking print can, for example, be applied frame-like on the interior-side surface of the second pane.

The contact strip 6 and the busbar 5 are, according to the invention, in direct contact. The electrical connection is thus made not via a soldering compound or an electrically conductive adhesive. Thus, the production process of the composite pane is decisively simplified. Moreover, the risk of damage to the busbar 7, as it exists, for example, with the soldering or the loading of a soldered connection, can be avoided.

Figure 3:
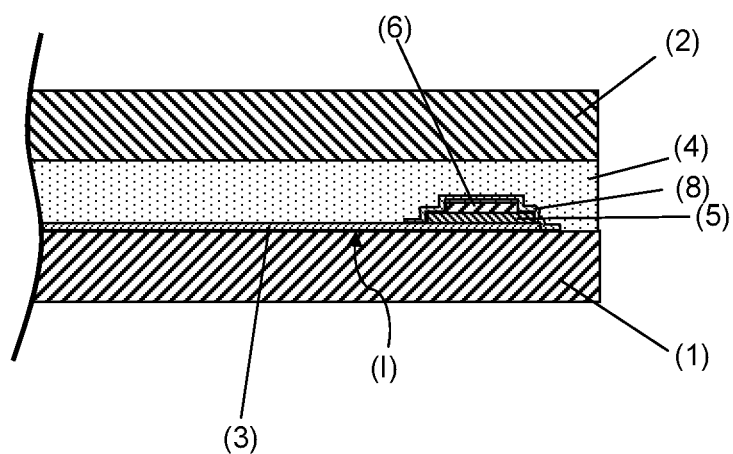

FIG. 3 depicts a cross-section through an alternative embodiment of the composite pane according to the invention in the region of the lower edge. The first pane 1 with the electrically conductive coating 3, the second pane 2, the thermoplastic intermediate layer 4, the busbars 5, the contact strips 6, and the external feed line 7 are configured as in FIG. 1. An adhesive strip 8 is arranged between the contact strip 6 and the thermoplastic intermediate layer 4. By means of the adhesive strip 8, the contact strip 6 is fixed on the interior-side surface (I) of the first pane 1. The adhesive strip 8 has a width of 2 cm and a length of 5 cm. The adhesive strip 8 runs over the surface of the contact strip 6 facing away from the busbar 5, protrudes beyond the long side edges of the contact strip 6, and is bonded to the first pane 1 or to the layers applied on the first pane 1 by means of the protruding region.

The advantage of the adhesive strip 8 resides in the fact that additional pressure is exerted on the system made up of the busbar 5 and the contact strip 6. Thus, the electrically conducting connection between the busbar 5 and the contact strip 6 is additionally stabilized. The use of the adhesive strip 8 has, moreover, process-engineering advantages: By means of the adhesive strip 8, the contact strip 6 can be stably fixed on the busbar 5 before the production of the composite pane. Thus, during the arranging of the thermoplastic intermediate layer 4 and the second pane 2 on the first pane 1, slippage or damage of the contact strip 6, for example, through folding, can be avoided.

Figure 4:
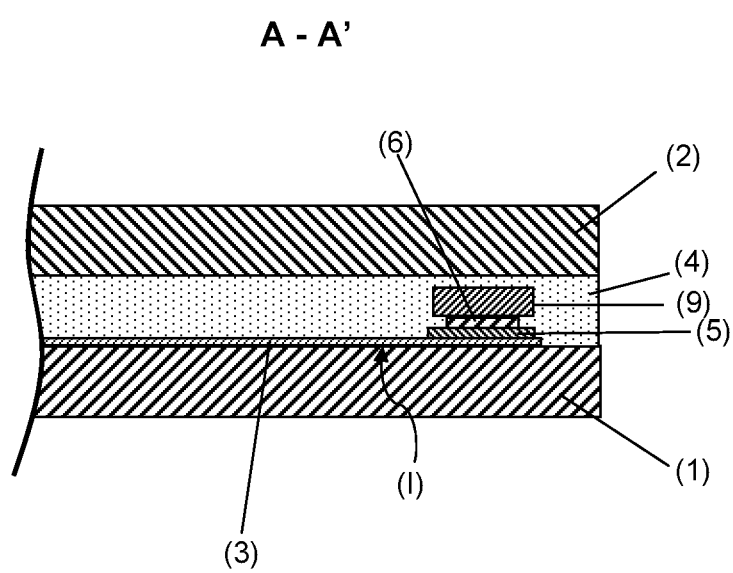

FIG. 4 depicts a cross-section through another embodiment of the composite pane according to the invention in the region of the lower edge. The first pane 1 with the electrically conductive coating 3, the second pane 2, the thermoplastic intermediate layer 4, the busbars 5, the contact strips 6, and the external feed lines 7 are configured as in FIG. 1. A pressure element 9 is arranged on the surface of the contact strip 6 facing away from the busbar 5. The pressure element 9 is a rectangular solid with a thickness of 0.3 mm, a length of 5 cm, and a width of 16 mm and is made of polymethyl methacrylate (PMMA). By means of the rigid pressure element 9 inside the composite glass, additional pressure is advantageously exerted on the system made up of the busbar 5 and the contact strip 6. Thus, the electrically conducting connection between the busbar 5 and the contact strip 6 is additionally stabilized.

Figure 5:
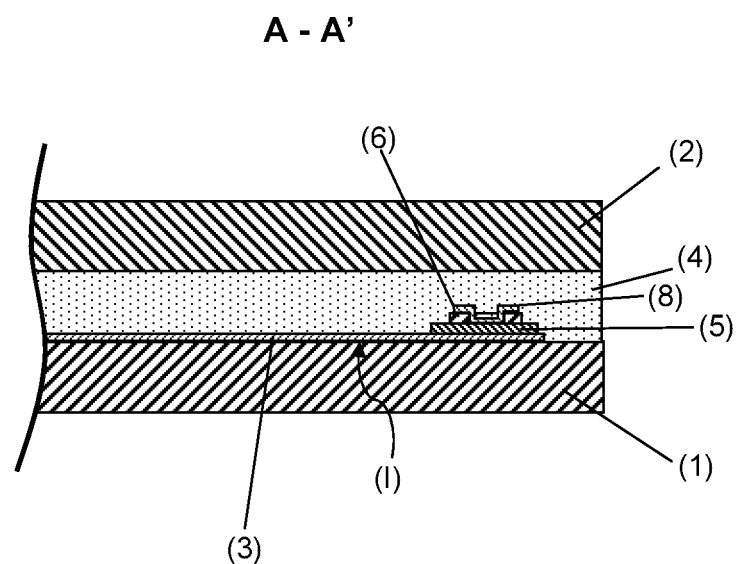

FIG. 5 depicts a cross-section through another embodiment of the composite pane according to the invention in the region of the lower edge. The contact strip 6 has, for example, three circular holes that are arranged along its length. One of the holes is discernible in the illustration. An adhesive strip 8 that is bonded to the busbar 5 through the holes is arranged on the surface of the contact strip facing away from the busbar. Thus, the contact strip 6 is already fixed on the busbar 5 at the time of the production of the composite pane. Moreover, by means of the adhesive strip 8, additional pressure, which stabilizes the electrical connection between the contact strip 6 and the busbar 5, Is exerted on the contact strip 6. The configuration of the contact strip 6 with holes has the advantage that the adhesive strip 8 can be dimensioned smaller than the contact strip 6. Then, it does not protrude beyond the side edges of the contact strip 6, which can be desirable for aesthetic reasons.

Figure 6:
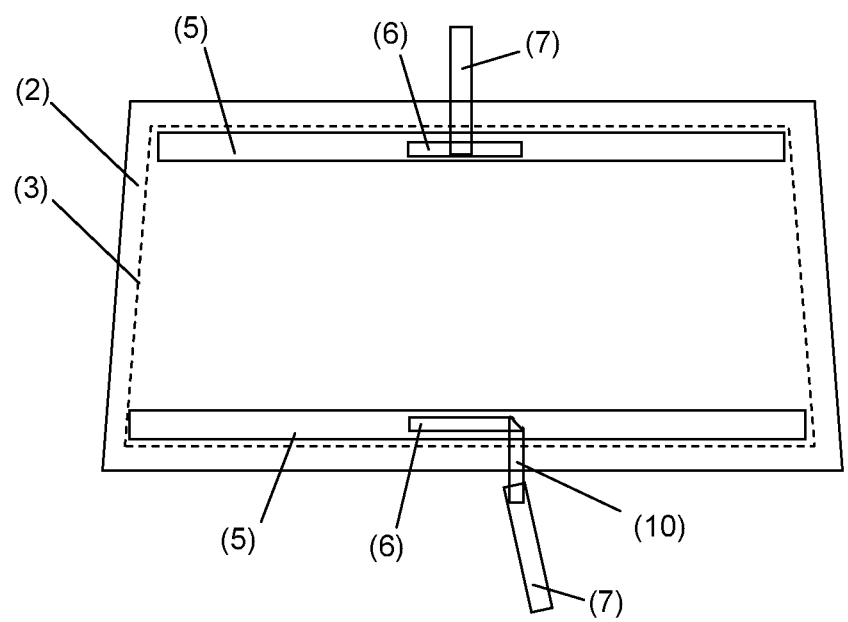

FIG. 6 depicts a top plan view of another embodiment of the composite pane according to the invention. The contact strip 6 of the lower busbar 5 is arranged on the busbar 5 and is in direct contact with the busbar 5. An electrical connection element 10 is implemented in one piece with the contact strip 6. The contact strip 6 and the electrical connection element 10 are sections of the same strip of an electrically conductive foil. By folding the strip, a change in the direction of the strip is realized such that the contact strip 6 runs parallel to the busbar 5 and the connection element 10 runs, starting from the busbar 5 beyond the side edge of the composite pane. Outside the composite pane, the connection element 10 is connected to the electrical feed line 7. In this configuration, the connection between the electrical feed line 7 and the connection element 10 can be made before or after the lamination of the first pane with the second pane.

Figure 6A:
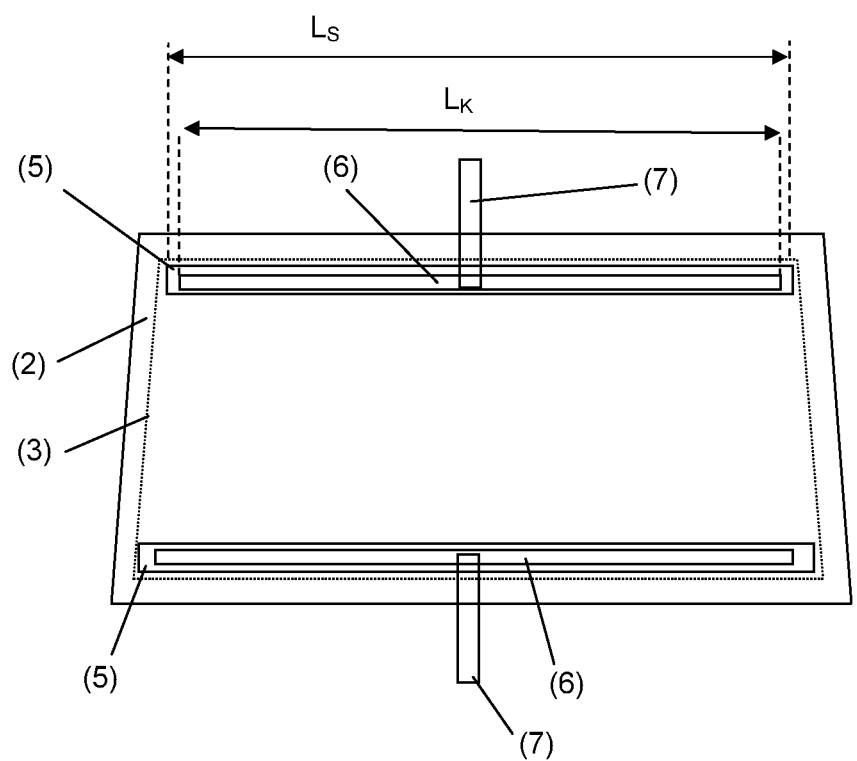

FIG. 6a depicts a top plan view of another embodiment of the composite pane according to the invention. In contrast to the exemplary embodiment of FIG. 1, the length $L_K$ of the contact strips 6 is roughly 95% of the length $L_S$ of the busbars 5. The contact strips 6 thus cover the busbars 5 along virtually their entire length such that the current-carrying capacity of the busbars 5 is significantly increased. Hot spots on the busbars 5 due to high local current strengths can thus be avoided.

Figure 7:
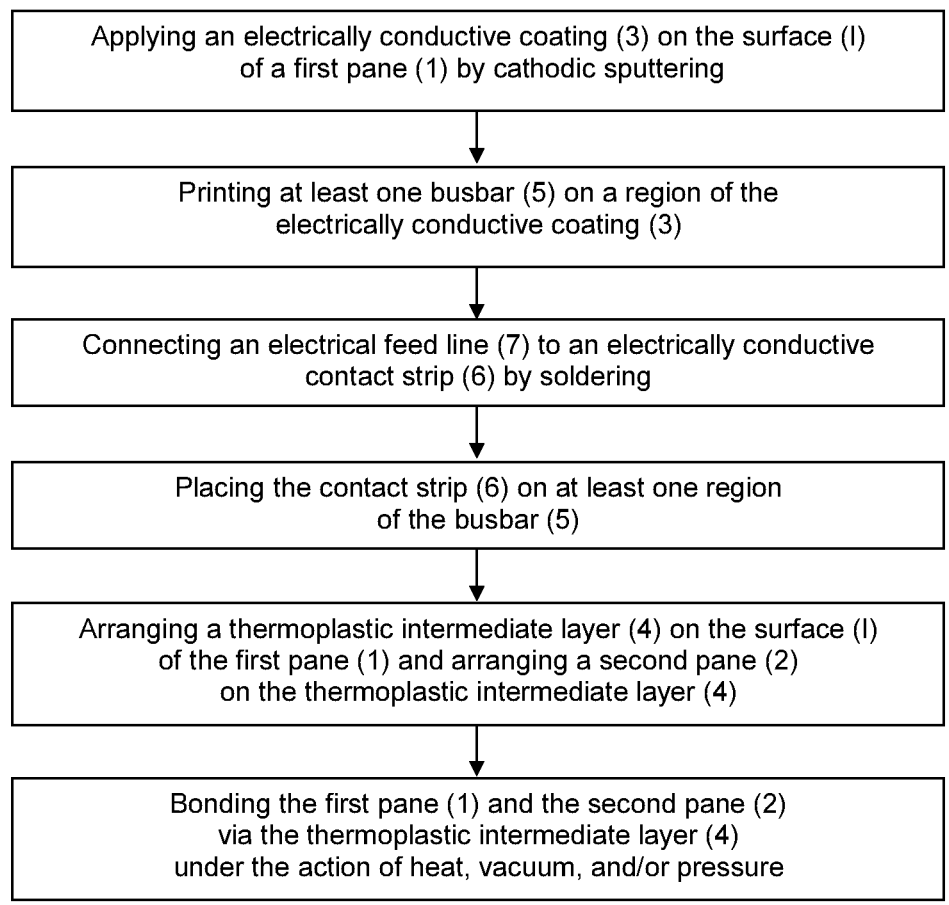

FIG. 7 depicts a flowchart of one exemplary embodiment of the method according to the invention for producing a composite pane with electrical contacting means.

Figure 8:
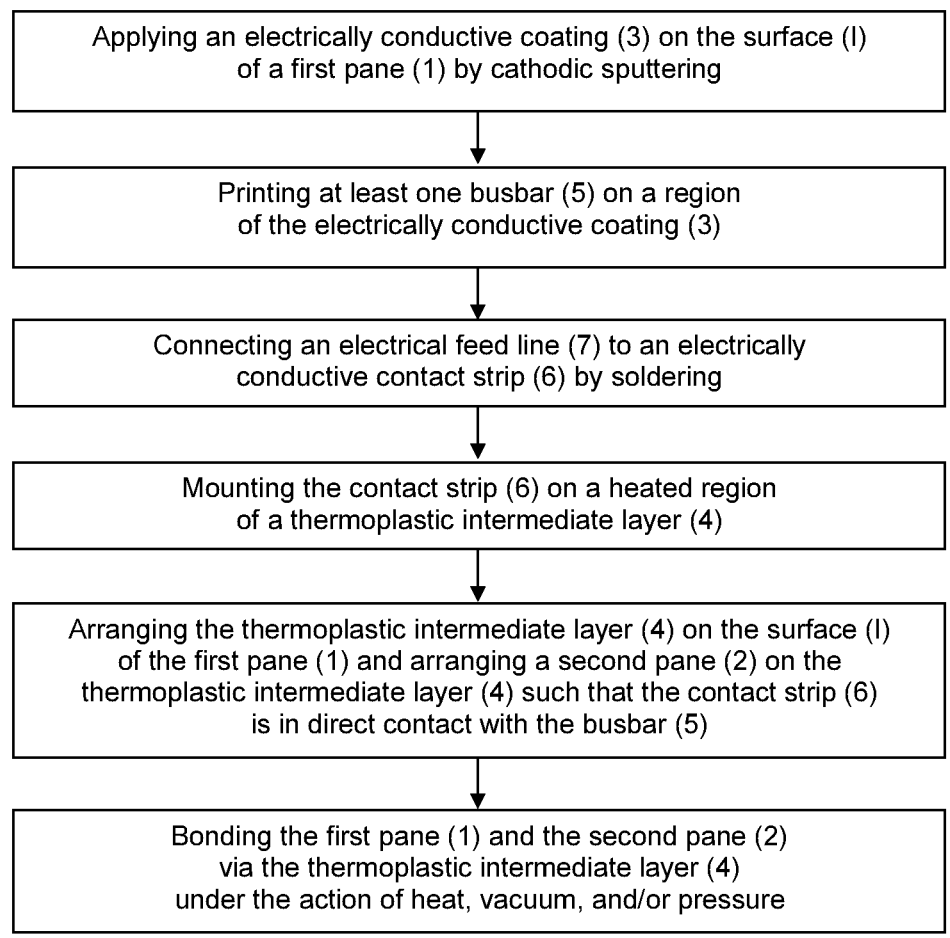

FIG. 8 depicts a flowchart of another exemplary embodiment of the method according to the invention for producing a composite pane with electrical contacting means.

In contrast with composite panes with a connection between busbar 5 and contact strip 6 or between busbar 5 and feed line 7 via a soldering compound or an electrically conductive adhesive, the contact strips 6 in a composite pane according to the invention are in direct contact with the busbars 5. On test panes according to the invention, it has been demonstrated that the production process can be significantly simplified and accelerated thereby. However, a durably stable electrical connection between the busbar 5 and the contact strip 6 is provided. This result was unexpected and surprising for the person skilled in the art.

LIST OF REFERENCE CHARACTERS (1) first pane
(2) second pane
(3) electrically conductive coating
(4) thermoplastic intermediate layer
(5) busbar
(6) contact strip
(7) electrical feed line
(8) adhesive strip
(9) pressure element
(10) electrical connection element between the contact strip 6 and the electrical feed line 7
(I) interior-side surface of the first pane 1
$L_S$ length of a busbar 5
$B_S$ width of a busbar 5
$L_K$ length of a contact strip 6
$B_K$ width of a contact strip 6
A-A' section line

The invention claimed is:

1. A composite pane with electrical contacting means, comprising:
    a first pane and a second pane, which are bonded face-to-face to each other via a thermoplastic intermediate layer,
    at least one electrically conductive coating located at least on the interior side surface of the first pane and used for active heating of the composite pane,
    at least one busbar containing silver particles and glass frits, and exhibiting uniform current flow located on a region of the at least one electrically conductive coating, and
    at least one electrically conductive contact strip located on at least one region of the at least one busbar, the at least one electrically conductive contact strip containing at least one metal and increasing the current carrying capacity of the at least one busbar,
        wherein the at least one busbar is layered between the at least one electrically conductive contact strip and the at least one electrically conductive coating, and
        wherein the at least one electrically conductive contact strip is connected to at least one electrical feed line, and at least one region of the at least one electrically conductive contact strip is in direct contact with the at least one busbar,
        wherein
            i) the at least one electrically conductive contact strip is fixed to the at least one busbar by an adhesive strip, wherein the adhesive strip protrudes beyond the at least one electrically conductive contact strip and is adhesively bonded to the first pane by means of a protruding portion, or
            ii) a rigid pressure element is arranged between the contact strip and the second pane so that an additional pressure is exerted on the contact strip in the direction of the at least one busbar.

2. The composite pane according to claim 1, wherein there is no mechanical connection, no connection via a soldering compound, and no connection by an adhesive, between the at least one busbar and the region of the at least one electrically conductive contact strip.

3. The composite pane according to claim 1, wherein the at least one electrically conductive contact strip is implemented as a strip of an electrically conductive foil and has a thickness from 10 μm to 500 μm, and contains at least copper, tinned copper, silver, gold, aluminum, zinc, tungsten, and/or tin.

4. The composite pane according to claim 3, wherein the at least one electrically conductive contact strip has a thickness from 15 μm to 200 μm.

5. The composite pane according to claim 1, wherein the at least one electrically conductive contact strip has a length $L_K$ from 10 mm to 100 mm, and a width $B_K$ from 2 mm to 40 mm.

6. The composite pane according to claim 5, wherein the at least one electrically conductive contact strip has a length $L_K$ from 20 mm to 60 mm and a width $B_K$ from 5 mm to 30 mm.

7. The composite pane according to claim 1, wherein a length $L_K$ of the at least one electrically conductive contact strip is 80% to 120% of a length $L_S$ of the at least one busbar.

8. The composite pane according to claim 7, wherein the length $L_K$ of the at least one electrically conductive contact strip is 90% to 110% of the length $L_S$ of the at least one busbar.

9. The composite pane according claim 1, wherein the at least one electrically conductive contact strip is in direct full-surface contact with the at least one busbar.

10. The composite pane according claim 1, wherein the at least one electrically conductive contact strip has a greater width than the at least one busbar.

11. The composite pane according to claim 1, wherein the at least one electrically conductive contact strip is connected to the electrical feed line via an electrical connection element.

12. The composite pane according to claim 11, wherein the at least one electrical connection element and the at least one electrically conductive contact strip are implemented in one piece.

13. The composite pane according to claim 1, wherein the at least one electrically conductive contact strip is fixed on the at least one busbar by an adhesive strip.

14. The composite pane according to claim 1, wherein, between the at least one electrically conductive contact strip and the second pane, a pressure element is arranged, which contains at least one polymer, one metal, or one alloy, and has a thickness greater than or equal to 200 μm, the pressure element being in contact with the at least one electrically conductive contact strip.

15. The composite pane according to claim 1, wherein the at least one busbar is implemented as a fired screen printing paste, which contains silver particles, and has a thickness from 5 μm to 40 μm.

16. The composite pane according to claim 15, wherein the at least one busbar has a thickness from 8 μm to 20 μm.

17. The composite pane according to claim 15, wherein the at least one busbar has a width Bs from 2 mm to 30 mm.

18. The composite pane according to claim 15, wherein the at least one busbar has a width Bs from 4 mm to 20 mm.

19. The composite pane according to claim 1, wherein the electrical feed line is implemented as a foil conductor.

20. The composite pane according to claim 19, wherein the at least one electrical feed line is connected to the at least one electrically conductive contact strip by a soldering compound or an electrically conductive adhesive.

21. The composite pane according to claim 1, wherein, between the at least one electrically conductive contact strip and the second pane, a pressure element is arranged, having a low elasticity.

22. A method for producing a composite pane with electrical contacting means, comprising:

applying an electrically conductive coating on one surface of a first pane used for active heating of the composite pane, applying at least one busbar containing silver particles and glass frits, and exhibiting uniform current flow on a region of the electrically conductive coating, arranging a thermoplastic intermediate layer on the one surface of the first pane, arranging a second pane on the thermoplastic intermediate layer, arranging at least one electrically conductive contact strip connected to an electrical feed line such that at least one region of the at least one electrically conductive contact strip is in direct contact with the at least one busbar thereby increasing the current carrying capacity of the at least one busbar, arranging the at least one bus bar between the at least one electrically conductive contact strip and the electrically conductive coating, and bonding the first pane and the second pane via the thermoplastic intermediate layer, wherein i) the at least one electrically conductive contact strip is fixed to the at least one busbar by an adhesive strip, wherein the adhesive strip protrudes beyond the at least one electrically conductive contact strip and is adhesively bonded to the first pane by means of a protruding portion, or ii) a rigid pressure element is arranged between the contact strip and the second pane so that an additional pressure is exerted on the contact strip in the direction of the at least one busbar.

23. The method according to claim 22, wherein the at least one electrically conductive contact strip is arranged on the at least one busbar and the thermoplastic intermediate layer is then arranged on the one surface.

24. The method according to claim 22, wherein the at least one electrically conductive contact strip is applied on the thermoplastic intermediate layer and the thermoplastic intermediate layer with the at least one electrically conductive contact strip is then arranged on the one surface.

25. The method of claim 22, further comprising:

using the composite pane as a pane selected from the group consisting of: a heatable pane, as a pane with antenna function, as a pane with switchable or variable optical properties, or as a photovoltaic module, or as a thin-film photovoltaic module, wherein the electrically conductive coating is an electrically heatable coating of a heatable pane or an antenna of a pane with antenna function or a plate electrode of a photovoltaic module.

26. A composite pane with electrical contacting means, comprising:

a first pane and a second pane, which are bonded face-to-face to each other via a thermoplastic intermediate layer, at least one electrically conductive coating located at least on the interior side surface of the first pane and used for active heating of the composite pane, at least one busbar containing silver particles and glass frits, and exhibiting uniform current flow located on a region of the at least one electrically conductive coating, and at least one electrically conductive contact strip located on at least one region of the at least one busbar, the at least one electrically conductive contact strip containing at least one metal and increasing the current carrying capacity of the at least one busbar, wherein the at least one busbar is arranged between the at least one electrically conductive contact strip and the at least one electrically conductive coating, wherein the at least one electrically conductive contact strip is connected to at least one electrical feed line, and at least one region of the at least one electrically conductive contact strip is in direct contact with the at least one busbar, wherein there is no mechanical connection, no connection via a soldering compound, and no connection by an adhesive, between the at least one busbar and the region of the at least one electrically conductive contact strip, and wherein i) the at least one electrically conductive contact strip is fixed to the at least one busbar by an adhesive strip, wherein the adhesive strip protrudes beyond the at least one electrically conductive contact strip and is adhesively bonded to the first pane by means of a protruding portion, or ii) a rigid pressure element is arranged between the contact strip and the second pane so that an additional pressure is exerted on the contact strip in the direction of the at least one busbar.

* * * * *